US011887392B2

(12) United States Patent
Slattery

(10) Patent No.: US 11,887,392 B2
(45) Date of Patent: Jan. 30, 2024

(54) SYSTEMS AND METHODS FOR DIGITIZED DOCUMENT IMAGE TEXT CONTOURING

(71) Applicant: Capital One Services, LLC, McLean, VA (US)

(72) Inventor: Douglas Slattery, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 111 days.

(21) Appl. No.: 17/359,262

(22) Filed: Jun. 25, 2021

(65) Prior Publication Data
US 2021/0326629 A1  Oct. 21, 2021

Related U.S. Application Data

(63) Continuation of application No. 16/748,396, filed on Jan. 21, 2020, now Pat. No. 11,074,473.

(51) Int. Cl.
*G06V 30/41* (2022.01)
*G06V 30/412* (2022.01)
*G06V 30/148* (2022.01)
*G06V 30/414* (2022.01)
*G06V 10/44* (2022.01)
*G06V 20/62* (2022.01)

(52) U.S. Cl.
CPC .......... *G06V 30/412* (2022.01); *G06V 10/44* (2022.01); *G06V 20/62* (2022.01); *G06V 30/153* (2022.01); *G06V 30/414* (2022.01)

(58) Field of Classification Search
CPC .. G06V 30/153; G06V 10/243; G06V 30/412; G06V 30/414; G06V 30/10; G06V 10/44; G06V 20/62
See application file for complete search history.

(56) References Cited

U.S. PATENT DOCUMENTS

| | | | |
|---|---|---|---|
| 4,558,461 A * | 12/1985 | Schlang | G06V 30/1478 382/296 |
| 5,050,222 A | 9/1991 | Lee | |
| 5,083,210 A | 1/1992 | Reilly et al. | |
| 5,197,107 A | 3/1993 | Katsuyama et al. | |
| 5,321,770 A | 6/1994 | Huttenlocher et al. | |
| 5,557,689 A | 9/1996 | Huttenlocher et al. | |
| 5,583,949 A | 12/1996 | Smith et al. | |
| 5,625,710 A | 4/1997 | Katsuyama et al. | |

(Continued)

*Primary Examiner* — Qian Yang
(74) *Attorney, Agent, or Firm* — HUNTON ANDREWS KURTH LLP

(57) ABSTRACT

Systems and methods for digitized document image text contouring are provided. One or more memories may be coupled to one or more processors, the one or more memories including instructions operable to be executed by the one or more processors. The one or more processors may be configured to receive a digitized document image. The one or more processors may be configured to preprocess the digitized document image to generate a plurality of contours. The one or more processors may be configured to adjust a plurality of bounding boxes of the plurality of contours; analyze the adjusted plurality of bounding boxes; create one or more clips based on the analysis; dynamically threshold the one or more clips; perform optical character recognition of the one or more clips; and receive output responsive to the optical character recognition.

20 Claims, 4 Drawing Sheets

(56) References Cited

U.S. PATENT DOCUMENTS

| | | |
|---|---|---|
| 5,687,253 A | 11/1997 | Huttenlocher et al. |
| 6,249,604 B1 | 6/2001 | Tuttenlocher et al. |
| 6,690,821 B2 | 2/2004 | Goldberg et al. |
| 7,310,773 B2 | 12/2007 | Lin |
| 7,561,742 B2 | 7/2009 | Boose et al. |
| 8,009,928 B1 | 8/2011 | Manmatha et al. |
| 8,290,302 B2 | 10/2012 | Nafarieh |
| 8,606,011 B1 | 12/2013 | Ivanchenko et al. |
| 8,768,057 B2 | 7/2014 | Saund |
| 8,965,117 B1 | 2/2015 | Rybakov et al. |
| 8,965,127 B2 | 2/2015 | Wu et al. |
| 9,104,940 B2 | 8/2015 | Wu |
| 9,412,052 B1 | 8/2016 | Natarajan et al. |
| 9,619,872 B1 | 4/2017 | Medina, III et al. |
| 10,002,301 B1 | 6/2018 | Mahmoud et al. |
| 10,176,400 B1 | 1/2019 | Rivard |
| 2002/0102022 A1 | 8/2002 | Ma et al. |
| 2005/0035193 A1 | 2/2005 | Gustin et al. |
| 2006/0029296 A1 | 2/2006 | King et al. |
| 2008/0292215 A1 | 11/2008 | Gaucas et al. |
| 2009/0016605 A1 | 1/2009 | Chao |
| 2009/0289115 A1 | 11/2009 | Chung |
| 2010/0080461 A1 | 4/2010 | Ferman |
| 2011/0007970 A1 | 1/2011 | Saund |
| 2011/0211760 A1 | 9/2011 | Boncyck et al. |
| 2012/0114243 A1 | 5/2012 | Vincent et al. |
| 2012/0224765 A1 | 9/2012 | Kim et al. |
| 2013/0251191 A1 | 9/2013 | Simske et al. |
| 2016/0057331 A1 | 2/2016 | Yoo et al. |
| 2017/0372460 A1 | 12/2017 | Zagaynov et al. |
| 2018/0027145 A1 | 1/2018 | Kurzhanskiy et al. |
| 2019/0310635 A1 | 10/2019 | Hazard et al. |
| 2019/0332893 A1 | 10/2019 | Roy Chowdhury et al. |
| 2020/0193708 A1 | 6/2020 | Maggiore et al. |

* cited by examiner

SYSTEMS AND METHODS FOR DIGITIZED DOCUMENT IMAGE TEXT CONTOURING

CROSS REFERENCE TO RELATED APPLICATION

The subject application is a Continuation of Ser. No. 16/748,396 filed Jan. 21, 2020, the complete disclosure of which is incorporated herein by reference in its entirety.

FIELD OF THE DISCLOSURE

The present disclosure relates to systems and methods for digitized document image text contouring.

BACKGROUND OF THE DISCLOSURE

Current solutions for optical character recognition systems read an entire document or image without particular attention to accurately segmenting and identifying desired regions or portions of data of the document or image. This can cause reduced quality of character recognition, increased processing time, and increased costs associated therewith. These and other drawbacks exist.

Accordingly, there is a need to accurately recognize text in a manner that efficiently uses system and other resources.

SUMMARY OF THE DISCLOSURE

In an exemplary embodiment, a document digitizing system may include one or more processors. The system may include one or more memories coupled to the one or more processors. The one or more memories may include instructions operable to be executed by the one or more processors. The one or more processors may be configured to receive a digitized document image. The one or more processors may be configured to preprocess the digitized document image to generate a plurality of contours. The one or more processors may be configured to adjust a plurality of bounding boxes of the plurality of contours. The one or more processors may be configured to analyze the adjusted plurality of bounding boxes. The one or more processors may be configured to create one or more clips based on the analysis. The one or more processors may be configured to dynamically threshold the one or more clips. The one or more processors may be configured to perform optical character recognition of the one or more clips. The one or more processors may be configured to receive output responsive to the optical character recognition.

In an example embodiment, a method may include capturing, by one or more processors, an image. The method may include processing, by the one or more processors, the image to generate first and second contours. The method may include adjusting, by the one or more processors, bounding boxes of the first and second contours. The method may include combining, by the one or more processors, the bounding boxes of the first and second contours. The method may include producing, by the one or more processors, one or more clips based on combining the bounding boxes. The method may include dynamically thresholding, by the one or more processors, the one or more clips. The method may include transmitting, by the one or more processors, the one or more clips for optical character recognition. The method may include receiving, by the one or more processors, textual output responsive to the optical character recognition.

In an example embodiment, a computer readable non-transitory medium include computer-executable instructions that are executed on a processor and may include the steps processing a digitized document image to generate a plurality of contours; adjusting a plurality of bounding boxes of the plurality of contours; creating one or more clips based on the analysis of the adjusted plurality of bounding boxes; dynamically thresholding the one or more clips; and receiving output responsive to optical character recognition of the one or more clips.

DETAILED DESCRIPTION

According to the various embodiments of the present disclosure, systems and methods are provided for digitized document image text contouring. Optical character recognition works well for documents that are laid out in a conventional book orientation and the image is of good quality. However, a shortcoming of OCR is that it converts an entire image in which case the text is not arranged in a storybook fashion (for example, left to right reading order, top down), and the resulting text becomes scrambled and difficult to parse. Static templates truncate data or include irrelevant data from other sections of the document image, thereby resulting in inaccurate output. As disclosed herein, rather than using an optical character recognition (OCR) engine to electronically read an entire document, only one or more portions of the document are selectively transmitted for OCR to account for printed data shifting in any direction, such as a collection of contours that are dynamically thresholded prior to being iteratively passed to the OCR engine. As a consequence, this results in reduced processing and improved OCR efficiency since the surface area for analysis is reduced because the collection of contours, instead of the entire digitized document image, is used for OCR. The present disclosure is directed towards locating sections of text of the digitized document image, improving the time it takes for an OCR process to convert the image into ASCII text that it would normally take to process the entire image, and also isolating one or more sections on the image that contain data of interest which may be extracted from OCR processing on the individual contours. As further described herein, the above technique may be accomplished by utilizing various digital image filters and without any prior knowledge or configuration of the image being analyzed.

Exemplary embodiments of digitized document image text contouring include and are not limited to text contouring one or more sections, portions or regions, such as an earnings section or deduction section of a paystub, or different preprinted boxes on IRS tax forms. Other examples may comprise government forms and/or business forms.

Figure 1:
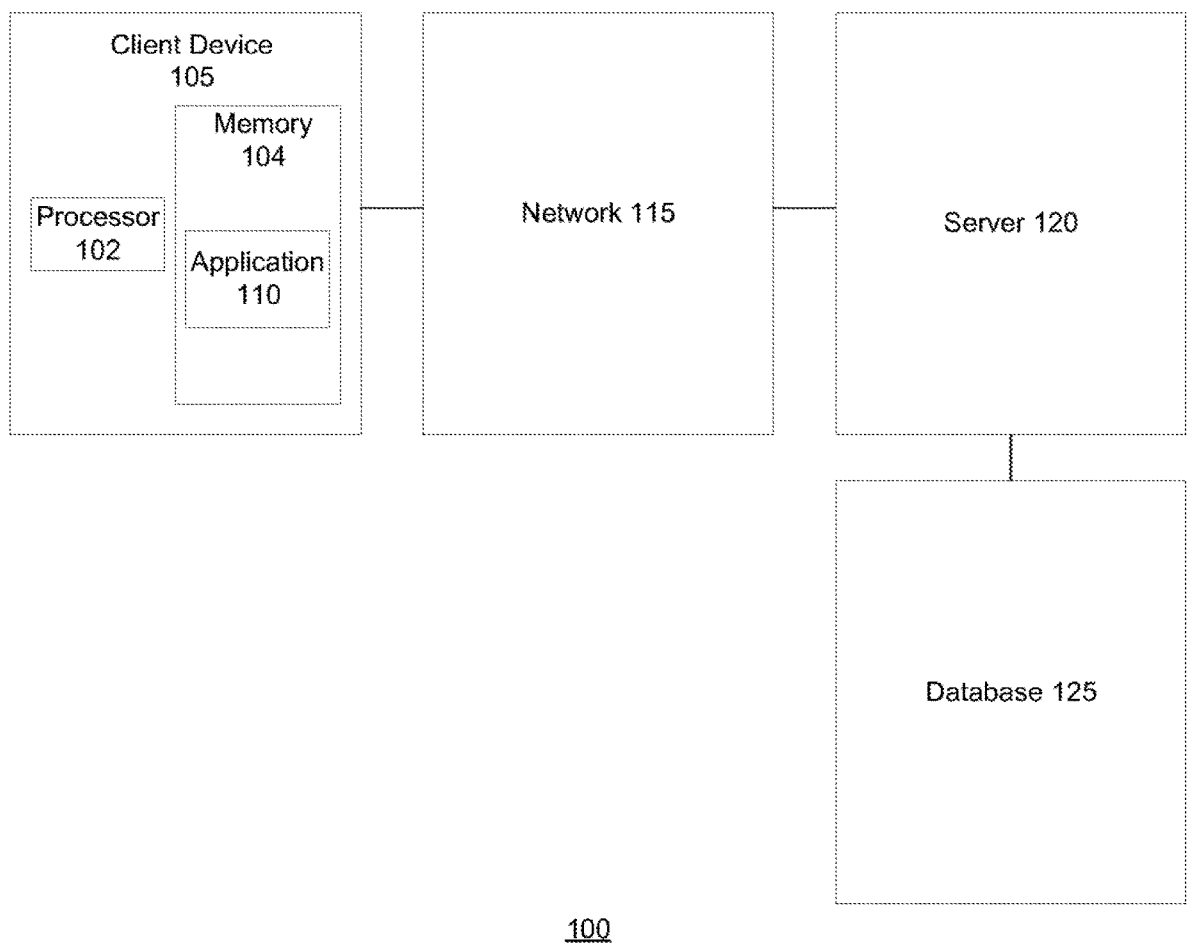
FIG. 1 depicts a block diagram of a system configured to provide digitized document image text contouring according to an example embodiment.

FIG. 1 illustrates a system 100 configured to provide digitized document image text contouring according to an example of the present disclosure. As further discussed below, system 100 may include client device 105, network 115, server 120, and database 125. Although FIG. 1 illustrates single instances of the components, system 100 may include any number of components, including one or more processors.

As shown in FIG. 1, client device 105, or end node 105, may be a network-enabled computer. As referred to herein, a network-enabled computer may include, but is not limited to: a computer device, or communications device including, e.g., a server, a network appliance, a personal computer, a workstation, a mobile device, a phone, a handheld PC, a personal digital assistant, a thin client, a fat client, an Internet browser, or other device. Client device 105 also may be a mobile device; for example, a mobile device may be a smart phone, a laptop computer, a tablet computer, a wearable device, and/or any other like mobile device or portable computing device.

In various examples according to the present disclosure, client device 105 of system 100 may include a processor 102 and memory 104. Memory 104 may comprise one or more applications 110 that comprises instructions for execution on client device 105. Client device 105 may execute one or more applications 110, such as software applications, that enable, for example, network communications with one or more components of system 100 and transmit and/or receive data. In some examples, an application 110 may be installed on client device 105, such as a mobile device. Application 110 may include instructions to perform digitized document image text contouring as described herein. In some examples, application 110 may include instructions to determine whether or not to perform a portion of digitized document image text contouring on client device 105 and/or transmit, via one or more networks 115, the digitized document image to another system, such as a server 120, database 125, or third party system. Client device 105 may be in communication with one or more servers 120 via one or more networks 115, and may operate as a respective front-end to back-end pair with server 120. Client device 105 may transmit, for example from a mobile device application 110 executing on client device 105, one or more requests to server 120. The one or more requests may be associated with retrieving data from server 120. Server 120 may receive the one or more requests from client device 105. Based on the one or more requests from client device 105, server 120 may be configured to retrieve the requested data from one or more databases 125. Based on receipt of the requested data from one or more databases 125, server 120 may be configured to transmit the received data to client device 105, the received data being responsive to one or more requests.

Data associated with the digitized document image may be received, captured, or otherwise obtained through a variety of processes. In some examples, a digitized document image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the digitized document image may be received from local storage. In some examples, digitized document image may be received from a cloud storage. For example, cloud computing may comprise an Internet connection between the systems that are operating in a cloud computing environment. The cloud computing environment (e.g. cloud) may comprise a plurality of systems such that one or more shared resources, such as processing, peripherals, software, data, servers, and the like are provided to any system of the cloud so as to allow access and distribution of services and/or data between the systems of the cloud.

Server 120 may include one or more processors, which are coupled to memory. Server 120 may be configured as a central system, server or platform to control and call various data at different times to execute a plurality of workflow actions. Server 120 may be configured to connect to database 125. Server 120 may be connected to at least one client device 105.

Network 115 may be one or more of a wireless network, a wired network or any combination of wireless network and wired network, and may be configured to connect client device 105 to server 120. For example, network 115 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth network, or any other wired or wireless network for transmitting and receiving a data signal.

In addition, network 115 may include, without limitation, telephone lines, fiber optics, IEEE Ethernet 802.3, a wireless network, a wide area network (WAN), a wireless personal area network (WPAN), a local area network (LAN), a body area network (BAN), a global network such as the Internet, a cellular network, or any combination thereof. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

In various examples, network 115 may be configured to provide data communication between a client device 105 and server 120 and between the client devices 105. For example, data may be communicated between client devices 105 and server 120 through the Internet or other network, and data may be communicated directly between client devices 105 and/or one or more databases 125 without passing through server 120. Accordingly, network 115 may be one or more of the Internet, Near Field Communication (NFC), Radio Frequency Identification (RFID), Bluetooth, Wi-Fi, and/or the like. Client devices 105 may be same or different devices.

System 100 may be configured to process the digitized document image if it is received in a skewed manner. For example, system 100 may be configured to process skew adjustment or morphage of the digitized document image for text contouring. System 100 may be configured to subject the digitized document image for preprocessing for contouring through one or more filters. For example, the image may be preprocessed by an Otsu threshold filter, a despeckle filter, and/or a grayscale filter. In some examples, the Otsu threshold filter may be configured to adjust one or more of brightness and contrast to improve readability of the digitized document image. In some examples, the despeckle filter may be configured to remove speckles, such as noise, from the digitized document image such that one or more pixels are whited out so it no longer remains a part of the image.

In some examples, system 100 may be configured to process skew adjustment or morphage of the image. Processing skew adjustment or image morphage may comprise processing image data to perform edge detection to the digitized document image so as to determine linearity of the content of the document based on vertical and horizontal edges. For example, if the edges are not parallel or perpendicular to the edges of the image boundary, system 100 may be configured to determine how many degrees the content should be rotated so as to sufficiently align the parallel or perpendicular edges to the image boundary edges. In the case where an image is tilted at an angle at the time of capture, a four point affine transformation algorithm may be applied by system 100 to correct it.

System 100 may be configured to preprocess the digitized document image through a plurality of passes to generate a plurality of contours, including at least first and second passes. A contour may comprise a line or a shape, or portion of a line or shape, including a regular or irregular form. For example, a contour may comprise a portion representing a region or outline in an image. In some examples, the first pass by system 100 may be configured for contouring one or more portions, such as one or more preprinted boxes. The first pass may include canny edge detection to identify one or more shapes in the image. Image contouring may comprise creating one or more geometric point arrays around the canny edge detection shapes. The geometric point arrays may be collected to create one or more bounding boxes. For example, canny edge detection may return one or more coordinate pairs, such as one or more (x,y) coordinate points. By receiving one or more (x,y) coordinate points, a vector may be created so as to generate one or more bounding boxes. In some examples, the one or more portions may comprise of rectangular-shaped preprinted boxes. The one or more portions may comprise oval regions, circular regions, square regions, polynomial regions, and checked box regions. In some examples, if the one or more portions are not rectangular-shaped, system 100 may be configured to convert the one or more portions to rectangular-shaped dimensions so as to continue processing of the digitized document image.

In some examples, the second pass by system 100 may be configured for contouring free form printed text. For example, the second pass may include a filter, such as a dilation filter, configured to prepare the digitized document image to capture free formed printed text and/or inputted text. The second pass may be configured to validate or confirm the text as-is. The second pass may include canny edge detection to identify one or more shapes in the image. In some examples, the dilation filter may be applied prior to canny edge detection. The shapes may be smudged together so as to create one or more blobs of pixels, which may be used for the contouring. For example, the one or more blobs of pixels may comprise the original text that is transformed by the dilation filter with the appearance that the text has been melted and smeared together so as to ensure that the letters comprising one or more sections of the text all touch each other. Canny edge detection may be applied to capture an entire section of the melted and smeared text. Image contouring may comprise creating one or more geometric point arrays around the canny edge detection shapes. Without the dilation filter, contouring may undesirably create geometric point arrays around each character. The geometric point arrays may be collected to create one or more bounding boxes. When one or more bounding boxes are created from the geometric point arrays, the pixel area of the bounding box may be within a range that may, for example, compose at least a single sentence paragraph of free form printed text. In some examples, results of OCR may determine if the text is of value. For example, canny edge detection may return one or more coordinate pairs, such as one or more (x,y) coordinate points. By receiving one or more (x,y) coordinate points, a vector may be created so as to generate one or more bounding boxes.

System 100 may be configured to identify a minimum and maximum pixel area range that the one or more contours may desirably fall within after all the contours have been created. For example, the range may be sufficiently large enough to represent a size of an area of text of the image. The one or more bounding boxes may be adjusted for data spillage outside of the bounding boxes. Although data, such as a signature, may often be written above or below a line of the bounding box, data spillage may capture data that flows outside of the bounding box. In some examples, system 100 may be configured to identify the original contour, utilize canny edge detection to determine spillage outside the bounding box, create a maximum range, resize the contour based on the range, and plot data that has spilled outside which becomes part of the new contour.

System 100 may be configured to analyze collection of bounding boxes for contours and merge the one or more bounding boxes so as to eliminate encapsulated boxes and combine overlaps. In some examples, a larger contour may encapsulate or otherwise surround a smaller contour within. For example, if the points of a first (inner) bounding box are all within a second (outer) bounding box, then the first (inner) bounding box may be merged with the second (outer) bounding box. In effect, the coordinates (not pixels) of the inner bounding box may be discarded. For overlaps, one contour may not enclose another so the contour may be resized. In some examples, if there is an overlap of two bounding boxes, system 100 may be configured to determine what the coordinates should be for a bounding box that encloses both bounding boxes. For example, the new bounding box may be created based on the determined coordinates and the coordinates (not pixels) of the original two bounding boxes may be discarded.

System 100 may be configured to create one or more clip images for the bounding box. In some examples, each contour's bounding box clip may be sent through OCR separately. For example, based on the coordinates of a bounding box that identifies a contour, system 100 may be configured to create a new image comprising the size of the bounding box and copy the pixels from the original image to the new image.

System 100 may be configured to utilize dynamic thresholding. In some examples, each bounding box may be thresholded to a desired level to achieve maximum OCR accuracy. This is because the one or more clips may be unthresholded. Thresholding may include alteration of the visibility of one or more pixels within a bounding box, including without limitation, increasing or decreasing brightness, increasing or decreasing contrast, and/or normalizing the brightness and/or contrast. For example, the image may comprise one or more portions that may appear darker, smudged, or crumped. Accordingly, thresholding of the one or more clips may be based on adjustment of one or more of the contrast and brightness of the image. In some examples, pixels of the bounding box may be thresholded to an optimal level based on at least one selected from the group of contrast and brightness. Dynamically thresholding the one or more clips in this manner, prior to passing into OCR, therefore increases system accuracy of the process. In some examples, the dynamic thresholding may comprise a formula to determine the optimal threshold for achieving maximum OCR accuracy, in part, based on frequency of the most dark pixels. The formula may also take into account one or more additional variables, including at least one selected from the group of contrast and brightness. In some examples, there may be a class, such as a JAVA or Python class, for each contour. An image, such as a smaller image, may be created from the clip of the original image, which becomes part of the class, and attributes may be included thereto. Thus, there may be one-to-one matching between the contour and the class, such that OCR is only performed on the clip image. In some examples, one or more attributes and/or dimensions generated by OCR include the clip comprising the contour, the coordinates of the contour, the dimensions of the contour, the text of the contour, additional text resulting from one or more spell correction techniques to OCR results, coordinates of each character in the contour, dimensions of each character in the contour, alternate characters from a machine learning OCR engine that have lower probability or accuracy ratings for each character in the contour. In some examples, the machine learning OCR engine may comprise a machine learning character classifier OCR engine. For example, the machine learning OCR engine may be trained to recognize and classify one or more characters. The machine learning OCR engine may be configured to predict character recognition based on a comparison with characters stored in or accessible to a database. In some examples, the machine learning OCR engine may be alternatively or additionally configured to utilize machine learning algorithms, such as gradient boosting, logistic regression, and neural networks. After OCR is performed for the one or more clips, output such as textual output may be received and analyzed. In some examples, system 100 may be configured to perform one or more conditional checks to validate one or more characters by transmitting the one or more clips through one or more additional OCR engines.

Figure 2:
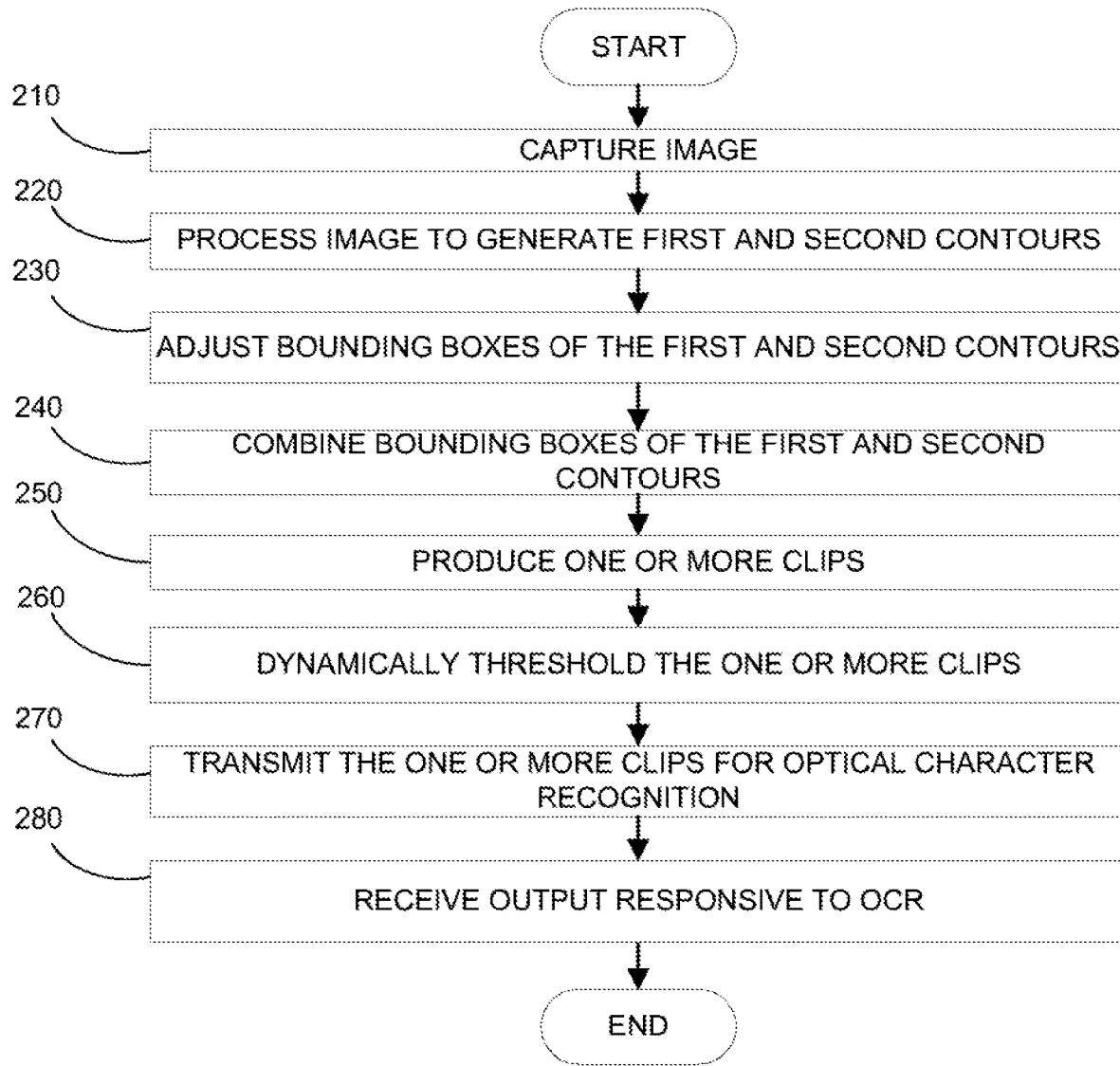
FIG. 2 depicts a flow diagram illustrating a method for digitized document image text contouring according to an example embodiment.

FIG. 2 illustrates a method 200 for digitized document image text contouring according to an example of the present disclosure. As explained below, method 200 may reference same or similar components of system 100. For example, as described herein, client device may be similar to client device 105 as described above with respect to FIG. 1. Exemplary embodiments of digitized document image text contouring include and are not limited to text contouring one or more sections, portions or regions, such as an earnings section or deduction section of a paystub, or different preprinted boxes on IRS tax forms. Other examples may comprise government forms and/or business forms.

At block 210, an image may be captured by one or more processors (similar to one or more processors as described above with respect to FIG. 1). In some examples, the image may comprise a digitized document image. In some examples, data associated with the image may be received, captured, or otherwise obtained through a variety of processes. In some examples, the image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the image may be received from local storage. In some examples, the image may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud. In some examples, processing, by the one or more processors, skew adjustment or morphage of the digitized document image for text contouring may be optionally performed. For example, skew adjustment or morphage of the digitized document image may comprise utilizing, by the one or more processors, edge detection to the digitized document image so as to determine linearity of the content of the document based on vertical and horizontal edges. For example, if the edges are not parallel or perpendicular to the edge of the image boundary, one or more processors may be configured to determine how many degrees the content should be rotated so as to sufficiently align the parallel or perpendicular edges to the edges of the image boundary. Where an image is tilted at an angle at the time of capture, one or more processors may be configured to correct it via one or more algorithms, such as a four point affine transformation algorithm.

At block 220, the image may be processed, by the one or more processors, through at least a first and second passes to generate respective first and second contours. For example, the image may be processed, by the one or more processors, through a plurality of passes to generate a plurality of contours. In some examples, preprocessing of the image may occur through one or more filters. For example, the image may be preprocessed by an Otsu threshold filter, a despeckle filter, and/or a grayscale filter. In some examples, the Otsu threshold filter may be configured to adjust one or more of brightness and contrast to improve readability of the digitized document image. In some examples, the despeckle filter may be configured to remove speckles, such as noise, from the digitized document image such that one or more pixels are whited out so it no longer remains a part of the image. Further details of the first and second passes are described in FIGS. 3 and 4, respectively.

At block 230, bounding boxes of the first contours and the second contours may be adjusted by the one or more processors. In some examples, a minimum and maximum pixel area range may be identified, by the one or more processors, that the one or more contours may desirably fall within after all the contours have been created. For example, the range may be sufficiently large enough to represent a size of an area of text of the image. The one or more bounding boxes may be adjusted for data spillage outside of the bounding boxes. Although data, such as a signature, may often be written above or below a line of the bounding box, data spillage may capture data that flows outside of the bounding box. In some examples, the one or more processors may be configured to identify the original contour, utilize canny edge detection to determine spillage outside the bounding box, create a maximum range, resize the contour based on the range, and plot data that has spilled outside which becomes part of the new contour. As previously explained, the first pass may be configured for contouring one or more portions, such as one or more preprinted boxes. The first pass may include canny edge detection to identify one or more shapes in the image. Image contouring may comprise creating one or more geometric point arrays around the canny edge detection shapes. The geometric point arrays may be collected to create one or more bounding boxes. For example, canny edge detection may return one or more coordinate pairs, such as one or more (x,y)

coordinate points. By receiving one or more (x,y) coordinate points, a vector may be created so as to generate one or more bounding boxes.

At block 240, the bounding boxes of the first and second contours may be combined by the one or more processors. In some examples, the collection of bounding boxes for contours may be analyzed, by the one or more processors, and overlaps of the one or more bounding boxes may be combined so as to eliminate encapsulated boxes. In some examples, a larger contour may encapsulate or otherwise surround a smaller contour within. For example, if the points of a first (inner) bounding box are all within a second (outer) bounding box, then the first (inner) bounding box may be merged with the second (outer) bounding box. In effect, the coordinates (not pixels) of the inner bounding box may be discarded. For overlaps, one contour may not enclose another so the contour may be resized. In some examples, if there is an overlap of two bounding boxes, the one or more processors may be configured to determine what the coordinates should be for a bounding box that encloses the two bounding boxes. For example, the new bounding box may be created based on the determined coordinates and the coordinates (not pixels) of the original two bounding boxes may be discarded.

At block 250, one or more clips may be produced, by the one or more processors, based on combining the bounding boxes. In some examples, based on the coordinates of a bounding box that identifies a contour, the one or more processors may be configured to create a new image comprising the size of the bounding box and copy the pixels from the original image to the new image.

At block 260, the one or more clips may be dynamically thresholded by the one or more processors. In some examples, each bounding box may be thresholded to a desired level to achieve maximum OCR accuracy. This is because the one or more clips may be unthresholded. Thresholding may include alteration of the visibility of one or more pixels within a bounding box, including without limitation, increasing or decreasing brightness, increasing or decreasing contrast, and/or normalizing the brightness and/or contrast. For example, the image may comprise one or more portions that may appear darker, smudged, or crumped. Accordingly, thresholding of the one or more clips may be based on adjustment of one or more of contrast and brightness of the image. In some examples, pixels of the bounding box may be thresholded to an optimal level based on at least one selected from the group of contrast and brightness. Dynamically thresholding the one or more clips in this manner, prior to passing into OCR, therefore increases system accuracy of the process. In some examples, the dynamic thresholding may comprise a formula to determine the optimal threshold for achieving maximum OCR accuracy, in part, based on frequency of the most dark pixels. The formula may also take into account one or more additional variables, including at least one selected from the group of contrast and brightness. In some examples, there may be a class, such as a JAVA or Python class, for each contour. An image, such as a smaller image, may be created from the clip of the original image, which becomes part of the class, and attributes may be included thereto. Thus, there may be one-to-one matching between the contour and the class, such that OCR is only performed on the clip image. In some examples, one or more attributes and/or dimensions generated by OCR include the clip including the contour, the coordinates of the contour, the dimensions of the contour, the text of the contour, additional text resulting from one or more spell correction techniques to OCR results, coordinates of each character in the contour, dimensions of each character in the contour, alternate characters from a machine learning OCR engine that have lower probability or accuracy ratings for each character in the contour. In some examples, the machine learning OCR engine may comprise a machine learning character classifier OCR engine. For example, the machine learning OCR engine may be trained to recognize and classify one or more characters. In some examples, the machine learning OCR engine may be alternatively or additionally configured to utilize machine learning algorithms, such as gradient boosting, logistic regression, and neural networks. The machine learning OCR engine may be configured to predict character recognition based on a comparison with characters stored in or accessible to a database.

At block 270, the one or more clips may be transmitted, by the one or more processors, for optical character recognition. In some examples, where one or more clip images may be created, by the one or more processors, for the bounding box, each clip may be transmitted for optical character recognition. In some examples, each contour's bounding box clip may be sent through OCR separately.

At block 280, output may be received, by the one or more processors, responsive to the optical character recognition. In some examples, the output may comprise textual output as a result of OCR. After OCR is performed for the one or more clips, output such as textual output may be received and analyzed. In some examples, the one or more processors may be configured to perform one or more conditional checks to validate one or more characters by transmitting the one or more clips through one or more additional OCR engines.

Figure 3:
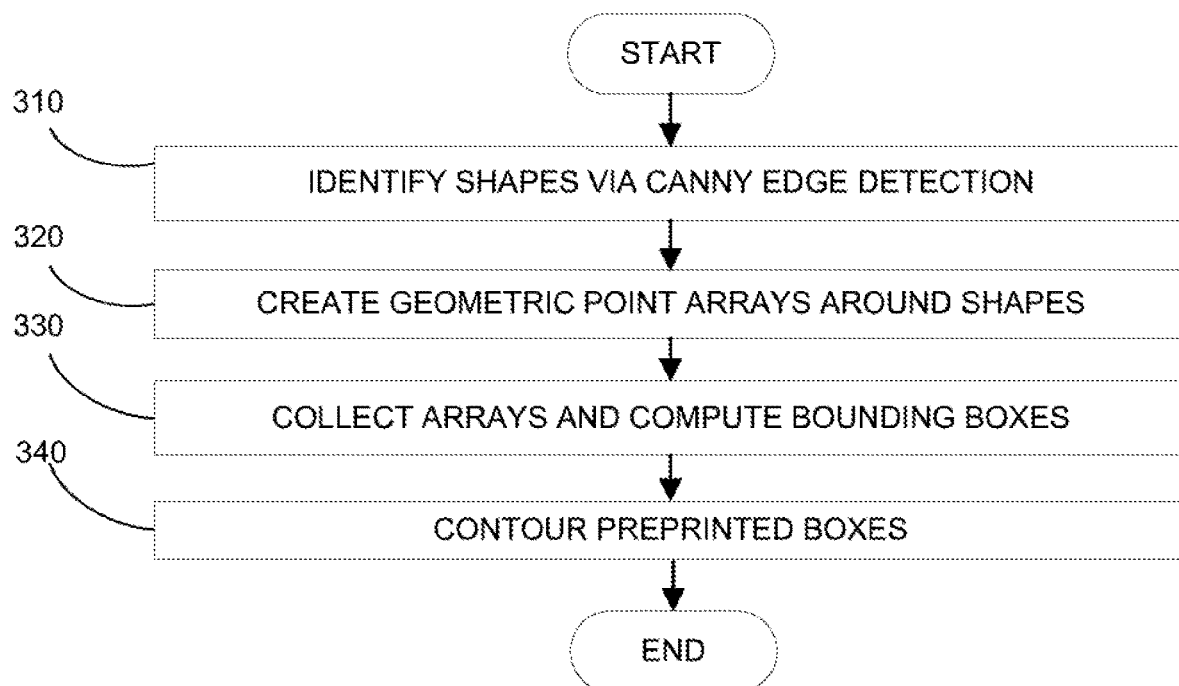
FIG. 3 depicts a flow diagram illustrating a method of a first pass configured for contouring preprinted regions according to an example embodiment.

FIG. 3 illustrates a method 300 of a first pass for contouring preprinted boxes. In some examples, the first pass by the one or more processors may be configured for contouring one or more portions, such as one or more preprinted boxes. At block 310, the first pass may include canny edge detection to identify one or more shapes in the image. At block 320, image contouring may comprise creating one or more geometric point arrays around the canny edge detection shapes. At block 330, the geometric point arrays may be collected to create one or more bounding boxes. For example, canny edge detection may return one or more coordinate pairs, such as one or more (x,y) coordinate points. By receiving one or more (x,y) coordinate points, a vector may be created so as to generate one or more bounding boxes. In some examples, the one or more portions may comprise of rectangular-shaped preprinted boxes. The one or more portions may comprise oval regions, circular regions, square regions, polynomial regions, and checked box regions. In some examples, if the one or more portions are not rectangular-shaped, the one or more processors may be configured to convert the one or more portions to rectangular-shaped dimensions so as to continue processing of the digitized document image. Thus, at block 340, the first pass is configured for contouring one or more preprinted boxes.

Figure 4:
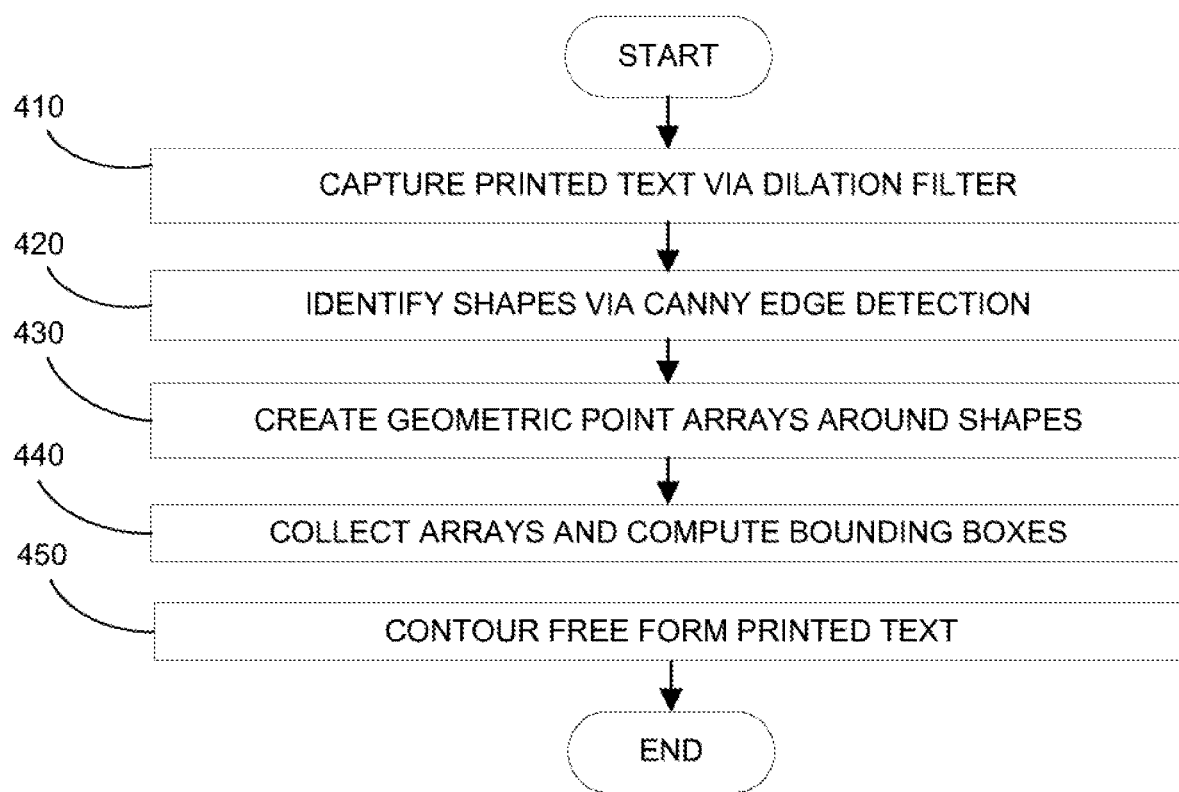
FIG. 4 depicts a flow diagram illustrating a method of a second pass configured for contouring free form printed text according to an example embodiment.

FIG. 4 illustrates a method 400 of a second pass for contouring free form printed text. In some examples, the second pass by the one or more processors may be configured for contouring free form printed text. For example, at block 410, the second pass may include a filter, such as a dilation filter configured to prepare the image to capture free formed printed text and/or inputted text. The second pass may be configured to validate or confirm the text as-is. At block 420, the second pass may include canny edge detection to identify one or more shapes in the image. In some examples, the dilation filter may be applied prior to canny edge detection. The shapes may be smudged together so as to create one or more blobs of pixels, which may be used for the contouring. For example, the one or more blobs of pixels may comprise the original text that is transformed by the dilation filter with the appearance that the text has been melted and smeared together so as to ensure that the letters comprising one or more sections of the text all touch each other. Canny edge detection may be applied to capture an entire section of the melted and smeared text. At block 430, image contouring may comprise creating one or more geometric point arrays around the canny edge detection shapes. Without the dilation filter, contouring may undesirably create geometric point arrays around each character. At block 440, the geometric point arrays may be collected to create one or more bounding boxes. When one or more bounding boxes are created from the geometric point arrays, the pixel area of the bounding box may be within a range that, for example, comprises at least a single sentence paragraph of free form printed text. In some examples, results of OCR may determine if the text is of value. For example, canny edge detection may return one or more coordinate pairs, such as one or more (x,y) coordinate points. By receiving one or more (x,y) coordinate points, a vector may be created so as to generate one or more bounding boxes. Thus, at block 450, the second pass is configured for contouring free form printed text.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

I claim:

1. A method, comprising:
   determining a linearity of an image, wherein determining the linearity of the image comprises:
      identifying, via canny edge detection, a vertical edge of the image and a horizontal edge of the image,
      identifying, via canny edge detection one or more boundaries of the image,
      calculating a first degree of rotation between the vertical edge of the image and at least one of the one or more boundaries of the image, and
      calculating a second degree of rotation between the horizontal edge of the image and at least one of the one or more boundaries of the image;
   applying, based on the determination, one or more linearity adjustments to the image;
   identifying, via canny edge detection, a shape within the image;
   generating a geometric point array based on the shape;
   creating a bounding box derived from the geometric point array;
   generating a contour via a pass over a preprinted portion of the image;
   smudging the shape to create a pixel blob; and
   applying a filter to transform the pixel blob to contact the preprinted portion.

2. The method of claim 1, further comprising adjusting the bounding box to include data spillage outside the bounding box by creating a pixel area range and resizing the contour based on the pixel area range.

3. The method of claim 2, further comprising:
   combining the bounding box with a second bounding box of a second contour; and
   generating a clip based on combining the bounding box with the second bounding box.

4. The method of claim 3, further comprising:
   dynamically thresholding the clip; and
   transmitting the clip for optical character recognition.

5. The method of claim 4, wherein the dynamic thresholding of the clip is based on a threshold associated with at least one of contrast and brightness.

6. The method of claim 5, wherein the predetermined threshold is based on an identification of a frequency of a level of darkness of a pixel.

7. The method of claim 4, further comprising, upon transmitting the clip for optical character recognition, performing a conditional check via a machine learning model.

8. The method of claim 1, wherein the pixel blob comprises an original text transformed by a dilation filter.

9. The method of claim 8, wherein the dilation filter is applied prior to the identification of the shape via canny edge detection.

10. The method of claim 1, further comprising:
    identifying, within the bounding box, a second bounding box; and
    merging the bounding box with the second bounding box.

11. The method of claim 1, further comprising:
    generating, by the canny edge detection, at least one geometric coordinate pair; and
    deriving, from the at least one geometric coordinate pair, the geometric point array.

12. A system, comprising:
a processor; and
a memory storing an image,
wherein the processor is configured to:
   determine a linearity of an image based on one or more vertical edges and horizontal edges of the image, wherein determining the linearity of the image comprises:
      identifying, via canny edge detection, a vertical edge of the image and a horizontal edge of the image,
      identifying, via canny edge detection one or more boundaries of the image,
      calculating a first degree of rotation between the vertical edge of the image and at least one of the one or more boundaries of the image, and
      calculating a second degree of rotation between the horizontal edge of the image and at least one of the one or more boundaries of the image;
   apply, based on the determination, one or more linearity adjustments to the image;
   identify, via canny edge detection, a shape within an image;
   generate a geometric point array based on the shape;
   create a bounding box derived from the geometric point array;
   generate a contour via a pass over a preprinted portion of the image;
   smudge the shape to create a pixel blob; and
   apply a filter to transform the pixel blob to contact the preprinted portion.

13. The system of claim 12, wherein the processor is further configured to:
   combine the bounding box with a second bounding box of a second contour; and
   generate a clip based on combining the bounding box with the second bounding box.

14. The system of claim 12, wherein the preprinted portion comprises at least one selected from the group of a rectangular region, an oval region, a circular region, a square region, a polynomial region, and a check box region.

15. The system of claim 14, wherein the processor is further configured to convert the preprinted portion to a rectangular portion.

16. The system of claim 12, wherein the creation of the bounding box comprises the collection of a plurality of geometric point arrays.

17. The system of claim 12, wherein the processor is further configured to:
   adjust the bounding box to include a data spillage outside the bounding boxes; and
   resize contour based on the pixel area range.

18. The system of claim 12, wherein a pixel area of the bounding box comprises a sentence of free form text.

19. A computer readable non-transitory medium comprising computer-executable instructions that are executed on a processor and comprise the steps of:
   determining a linearity of an image based on one or more vertical edges and horizontal edges of the image, wherein determining the linearity of the image comprises:
      identifying, via canny edge detection, a vertical edge of the image and a horizontal edge of the image,
      identifying, via canny edge detection one or more boundaries of the image,
      calculating a first degree of rotation between the vertical edge of the image and at least one of the one or more boundaries of the image, and
      calculating a second degree of rotation between the horizontal edge of the image and at least one of the one or more boundaries of the image;
   applying, based on the determination, one or more linearity adjustments to the image;
   identifying, via canny edge detection, a shape within an image;
   generating a geometric point array based on the shape;
   creating a bounding box derived from the geometric point array;
   generating a contour via a pass over a preprinted portion of the image;
   smudging the shape to create a pixel blob; and
   applying a filter to transform the pixel blob to contact the preprinted portion.

20. The computer readable non-transitory medium of claim 19, wherein the one or more linearity adjustments comprise applying a four point affine transformation algorithm.

* * * * *